United States Patent [19]

Schossow et al.

[11] Patent Number: 5,467,396

[45] Date of Patent: Nov. 14, 1995

[54] TAMPER-PROOF DATA STORAGE

[75] Inventors: Stephen R. Schossow, San Diego; Thomas C. Reiner, Carlsbad, both of Calif.

[73] Assignee: The Titan Corporation, San Diego, Calif.

[21] Appl. No.: 144,052

[22] Filed: Oct. 27, 1993

[51] Int. Cl.⁶ .............................. G06F 12/14; H04L 9/22
[52] U.S. Cl. .............................. 380/4; 380/3; 364/246.9; 364/969.3; 364/DIG. 1; 364/DIG. 2
[58] Field of Search ........................ 380/3, 4; 364/246.9, 364/969.3

[56] References Cited

U.S. PATENT DOCUMENTS

| | | | |
|---|---|---|---|
| 3,576,594 | 4/1971 | Cordoro, Jr. et al. | 364/200 |
| 3,742,458 | 6/1973 | Inoue et al. | 340/172.5 |
| 3,825,903 | 7/1974 | Brown | 364/200 |
| 4,641,241 | 2/1987 | Boram | 364/409 |
| 4,698,750 | 10/1987 | Wilkie et al. | 364/200 |
| 4,796,235 | 1/1989 | Sparks et al. | 365/228 |
| 4,821,240 | 4/1989 | Nakamura et al. | 365/228 |
| 5,083,293 | 1/1992 | Gilberg et al. | 365/189.01 |
| 5,097,504 | 3/1992 | Camion et al. | 380/23 |
| 5,099,516 | 3/1992 | Durkin et al. | 380/4 |
| 5,335,334 | 8/1994 | Takahashi et al. | 380/4 |
| 5,349,249 | 9/1994 | Chiang et al. | 380/4 |

OTHER PUBLICATIONS

DeFrancesco and Schrenk, "Intelligent Non–Volatile Memory for Smart Cards", IEEE Transactions on Consumer Electronics, CE–32 (1986) Aug No. 3 pp. 604–607.

*Primary Examiner*—Gilberto Barron, Jr.
*Attorney, Agent, or Firm*—Edward W. Callan

[57] ABSTRACT

In a data processing system, stored data that is essential to a given data processing operation, such encryptographic key generation, is tamper proof in that if such data is altered, processing of the altered data is inhibited upon retrieval. The system includes a memory for storing a plurality of data bits and in which the storage of one type of the bits is irreversible; a data processor, such as a cryptographic processor, coupled to the memory for retrieving the bits from a first section of the memory and for processing the retrieved bits with other data bits; an authentication unit coupled to the memory for processing the bits stored in the first section of the memory with bits stored in a second section of the memory to provide an indication as to whether or not the bits stored in the first section of the memory have a predetermined relationship to the bits stored in the second section of the memory; and a gate coupled to the data processor and to the authentication unit for inhibiting the data processor from processing the data bits retrieved from the first section of the memory unless the authentication unit indicates that the bits stored in the first section of the memory have the predetermined relationship to the bits stored in the second section of the memory. Since storage of one type of the bits is irreversible, although a pirate can alter the logic state of one type of bit in one section of the memory, he cannot alter the the logic state of the other type of bit in the other of the memory so as restore the predetermined relationship between the bits in the first section of the memory and the bits in the second section of the memory.

11 Claims, 2 Drawing Sheets

TAMPER-PROOF DATA STORAGE

BACKGROUND OF THE INVENTION

The present invention generally pertains to data processing and is particularly directed to a data processing system in which stored data that is essential to a given data processing operation is tamper proof.

The present invention is particularly useful in a data processing system that includes a cryptographic processor in which a cryptographic key is generated in response to a predetermined set of data bits stored in and retrieved from a memory. A pirate wanting to intercept a given encrypted information signal and being in possession of such a data processing system that would be capable of decrypting the given encrypted information signal but for the fact that it is incapable of generating a cryptographic key required for such decryption because a different predetermined set of data bits is stored in the memory, may attempt to alter the content of the data bits stored in the memory in order to generate the cryptographic key required to decrypt the given encrypted information signal.

SUMMARY OF THE INVENTION

The present invention provides a data processing system in which stored data that is essential to a given data processing operation is tamper proof in that if such data is altered, processing of the altered data is inhibited upon retrieval, the system comprising a memory for storing a plurality of data bits and in which the storage of one type of said bits is irreversible; a data processor coupled to the memory for retrieving said bits from a first section of the memory and for processing the retrieved bits with other data bits; authentication means coupled to the memory for processing the bits stored in the first section of the memory with bits stored in a second section of the memory to provide an indication as to whether or not the bits stored in the first section of the memory have a predetermined relationship to the bits stored in the second section of the memory; and a gate coupled to the data processor and to the authentication means for inhibiting the data processor from processing the data bits retrieved from the first section of the memory unless the authentication means indicate that the bits stored in the first section of the memory have said predetermined relationship to the bits stored in the second section of the memory. One example of such irreversibility is that a logic ONE state can be changed to a logic ZERO state but a logic ZERO state cannot be changed to a logic ONE state.

Since storage of one type of the bits is irreversible, although a pirate can alter the logic state of one type of bit in one section of the memory, he cannot alter the logic state of the other type of bit in the other section of the memory so as restore the predetermined relationship between the bits in the first section of the memory and the bits in the second section of the memory.

One example of such a predetermined relationship is that the bits stored in the first section of the memory are the binary complement of the bits stored in the second section of the memory. Another example of such a predetermined relationship is that the binary value of the bits stored in the second section of the memory is equal to the number of either one type or the other type of said bits stored in the first section of the memory.

In a preferred embodiment of the system of the present invention, the data processor is a cryptographic processor that generates a cryptographic key in response to the data bits retrieved from the first section of the memory.

Additional features of the present invention are described in relation to the detailed description of the preferred embodiments.

DETAILED DESCRIPTION

Figure 1:
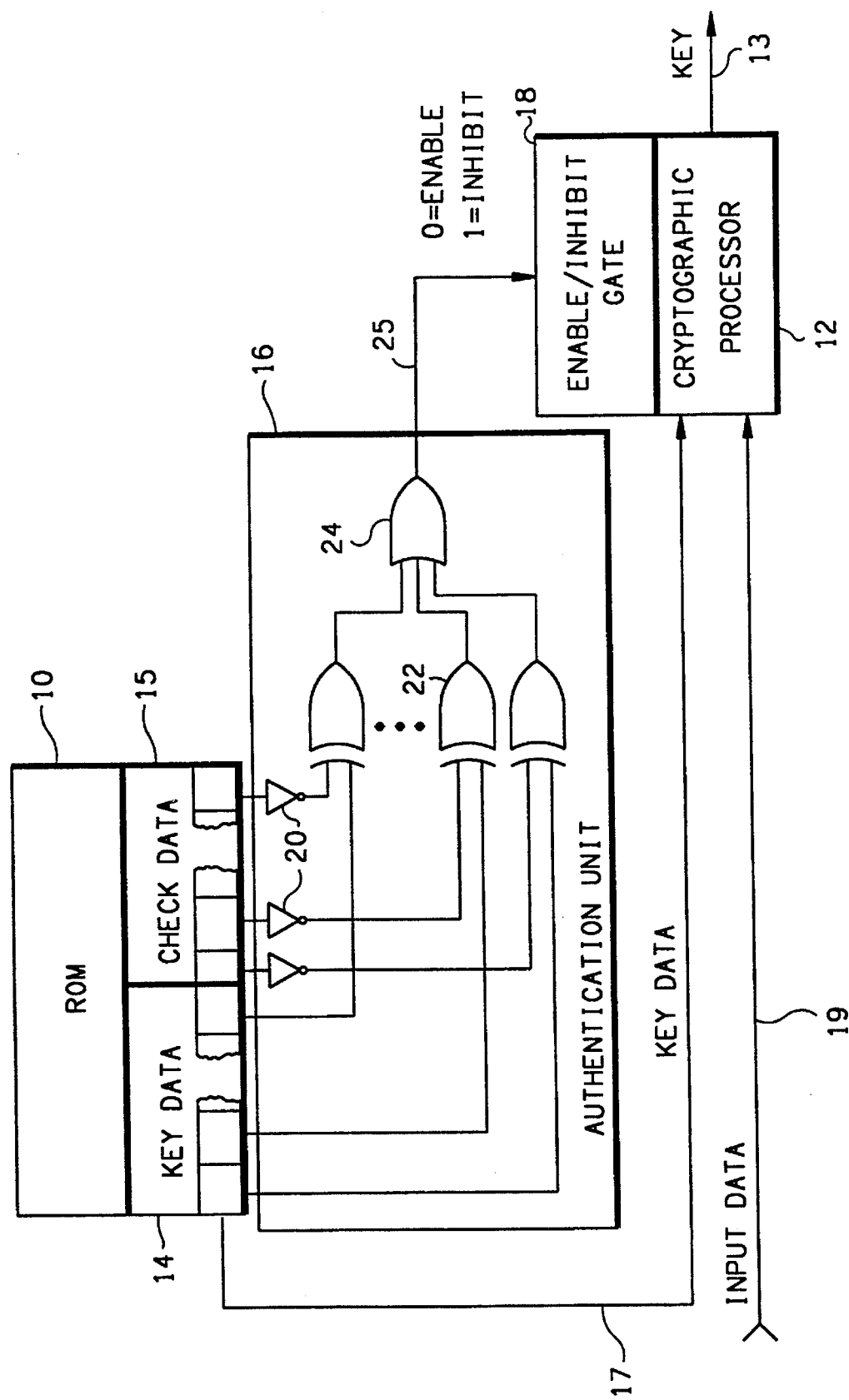
FIG. 1 is a block diagram of a preferred embodiment of a data processing system according to the present invention

Referring to FIG. 1, one preferred embodiment of a data processing system according to the present invention includes a memory 10, a data processor 12, an authentication unit 16 and an enable/inhibit gate 18.

The memory 10 is a read-only memory (ROM) for storing a plurality of data bits, in which the storage of one type of the bits (ONE or ZERO) is irreversible. The memory 10 includes a first section 14 and a second section 15. Key data bits are stored in the first section 14 of the memory 10; and check data bits are stored in the second section 15 of the memory 10. The data bits are stored in the memory 10 such that there is a predetermined relationship between the key data bits stored in the first section 14 and the check data bits stored in the second section 15. In this embodiment, the preferred relationship is that the key data bits stored in the first section 14 of the memory 10 are the binary complement of the check data bits stored in the second section 15 of the memory 10.

The data processor 12 is a cryptographic processor that retrieves the key data bits 17 from the first section 14 of the memory 10 and generates a cryptographic key 13 in response to the retrieved key data bits 17 by processing the retrieved key data bits 17 with input data bits 19. Preferably the cryptographic processor 12 generates the cryptographic key 13 by processing the input data 19 in accordance with an encryption algorithm, such as the DES (data encryption standard) algorithm, with the encryption algorithm being keyed by the retrieved key data bits 17.

The authentication unit 16 is coupled to the memory 10 for processing the key data bits stored in the first section 14 of the memory 10 with check data bits stored in the second section 15 of the memory 10 to provide an indication as to whether or not the key data bits have the predetermined relationship to the check data bits. The authentication unit 16 includes a logic array 20, 22, 24 coupled to the memory 10 for separately comparing each of the bits stored in the first section 14 of the memory 10 with bits stored in respectively corresponding bit positions of the second section 15 of the memory 10 and for indicating whether any of the compared pairs of bits are the same.

The logic array includes a plurality of inverters 20, a plurality of exclusive-OR (XOR) gates 22, and an OR gate 24. The inverters 20 have their inputs respectively connected to the different check data bit positions of the second section 15 of the memory 10. Each of the XOR gates 22 has one input connected to a different key data bit position of the first section 14 of the memory 10 and the other input connected to the output of the inverter 20 that is connected to the corresponding check data bit position of the second section 15 of the memory 10 for separately comparing each of the bits stored in the first section 14 of the memory 10 with the bits stored in respectively corresponding bit positions of the second section 15 of the memory 10. The OR gate 24 has its inputs connected to the outputs of the XOR gates 22 for indicating whether any of the compared pairs of bits are the same.

Since in this preferred embodiment the predetermined relationship between the key data bits stored in the first section 14 and the check data bits stored in the second section 15 is that the key data bits stored in the first section 14 of the memory 10 are the binary complement of the check data bits stored in the second section 15 of the memory 10, if none of the key data bits have been altered, each of the XOR gates 22 provides a ZERO signal to the OR gate 24, which in turn provides a ZERO output signal on line 25 to the enable/inhibit gate 18, thereby indicating that the key data bits stored in the first section 14 of the memory 10 have the predetermined relationship to the check data bits stored in the second section 15 of the memory 10. However, if any one of the key data bits has been altered, the XOR gate 22 connected to the position in the first section 14 of the memory containing the altered key data bit provides a ONE signal to the OR gate 24, which in turn provides a ONE output signal on line 25, thereby indicating that the key data bits stored in the first section 14 of the memory 10 do not have the predetermined relationship to the check data bits stored in the second section 15 of the memory 10.

Since storage of one type of the bits is irreversible, although a pirate can alter the logic state of one type of bit in one section 14/15 of the memory 10, he cannot alter the the logic state of the other type of bit in the corresponding bit position of the other section 15/14 of the memory 10 so as restore the complementary relationship between the key data bits in the first section 14 and the check data bits in the second section 15.

The enable/inhibit gate 18 is coupled to the data processor 12 for either enabling or inhibiting the data processor from processing the key data bits 17 retrieved by the data processor 12 from the first section 14 of the memory 10 in accordance with whether or not the authentication unit 16 indicates that the bits stored in the first section 14 of the memory 10 have the predetermined relationship to the bits stored in the second section 15 of the memory 10. When none of the pairs of bits separately compared by the inverters 20 and the XOR gates 22 are the same so that the authentication unit 16 indicates by a ZERO signal on line 25 that the key data bits stored in the first section 14 of the memory 10 have the predetermined relationship to the check data bits stored in the second section 14 of the memory 10, the gate 18 enables the cryptographic processor 12 to process the key data bits 17 retrieved by the data processor 12 from the first section 14 of the memory 10. When any of the pairs of bits separately compared by the inverters 20 and the XOR gates 22 are the same so that the authentication unit 16 indicates by a ONE signal on line 25 that the key data bits stored in the first section 14 of the memory 10 do not have the predetermined relationship to the check data bits stored in the second section 14 of the memory 10, the gate 18 Inhibits the cryptographic processor 12 from processing the key data bits 17 retrieved by the data processor 12 from the first section 14 of the memory 10.

Figure 2:
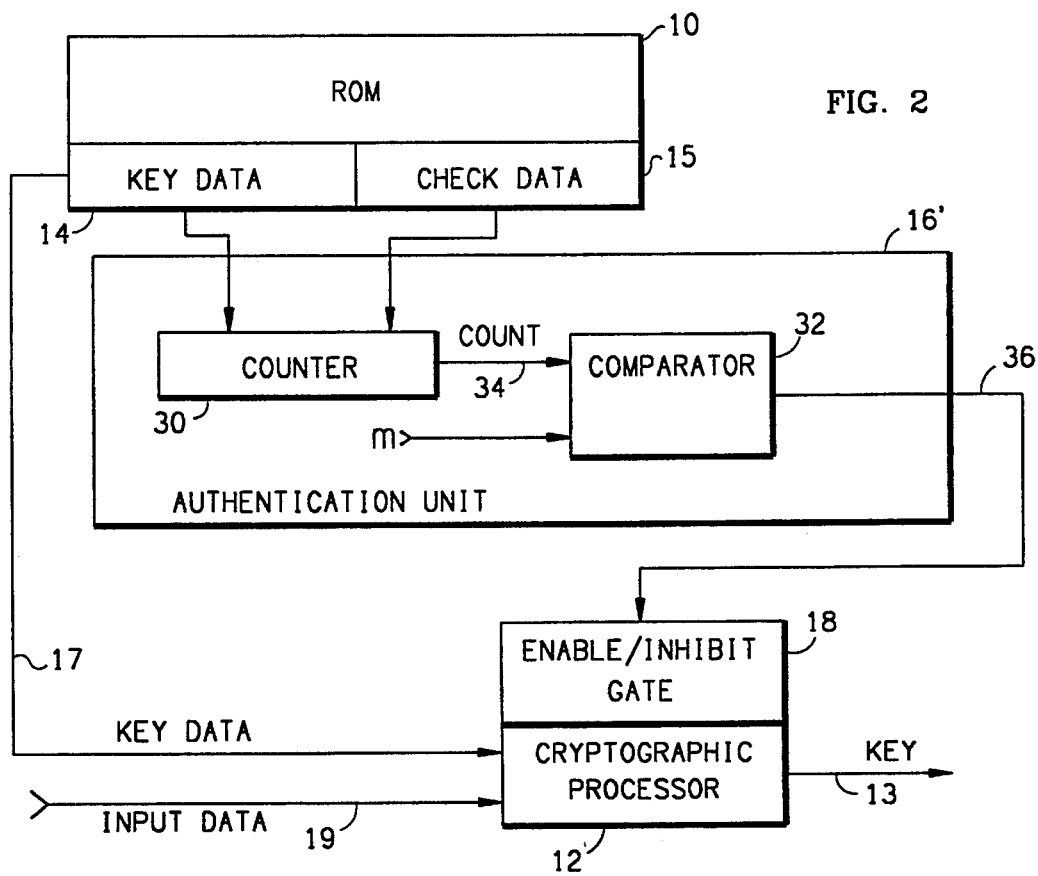
FIG. 2 is a block diagram of an alternative preferred embodiment of a data processing system according to the present invention

Referring to FIG. 2, another preferred embodiment of a data processing system according to the present invention includes a memory 10, a data processor 12, an authentication unit 16' and an enable/inhibit gate 18. In this embodiment, the memory 10, the data processor 12 and the enable/inhibit gate 18 are the same as in the preferred embodiment described above with reference to FIG. 1, and the predetermined relationship between the key data bits stored in the first section 14 and the check data bits stored in the second section 15 is that the key data bits stored in the first section 14 of the memory 10 are the binary complement of the check data bits stored in the second section 15 of the memory 10.

The authentication unit 16' is coupled to the memory 10 for processing the key data bits stored in the first section 14 of the memory 10 with check data bits stored in the second section 15 of the memory 10 to provide an indication as to whether or not the key data bits have the predetermined relationship to the check data bits. The authentication unit 16' includes a counter 30 and a comparator 32.

In order for the predetermined relationship of the key data bits stored in the first section 14 of the memory 10 being the binary complement of the check data bits stored in the second section 15 of the memory 10 to exist, the total number of either one type or the other type of the bits stored in both the first section 14 and the second section 15 of the memory 10 must equal the number of bits stored in the first section 14 of the memory 10.

The counter 30 is coupled to the memory 10 for for counting the total number of either one type or the other type of the bits stored in both the first section 14 and the second section 15 of the memory 10 and for providing said count on line 34 to the comparator 32.

The comparator 32 compares the count of the counter 30 provided on line 34 with a predetermined number "m", which equals the number of bits stored in the first section 14 of the memory 10 to provide an indication as to whether or not such count equals the number of bits stored in the first section 14 of the memory 10. When the count provided on line 34 equals the number of bits stored in the first section 14 of the memory 10, the comparator 32 provides a ZERO signal on line 36 to indicate such equality. When the count provided on line 34 does not equal the number of bits stored in the first section 14 of the memory 10, the comparator 32 provides a ONE signal on line 36 to indicate such nonequality.

When the counter 30 counts the type of bit of which storage is irreversible, the comparator provides a ONE signal on line 36 whenever the count on line 34 exceeds the predetermined number "m". When the counter 30 counts the type of bit of which storage is reversible, the comparator provides a ONE signal on line 36 whenever the count on line 34 is less than the predetermined number "m".

Since the predetermined relationship of the key data bits stored in the first section 14 of the memory 10 being the binary complement of the check data bits stored in the second section 15 of the memory 10 cannot exist if either the total number of the irreversible type of bit in both the first section 14 and the second section 15 exceeds the number of key data bits stored in the first section 14 of the memory 10 or the total number of the reversible type of bit in both the first section 14 and the second section 15 is less than the number of key data bits stored in the first section 14, the provision by the comparator 32 of a ONE signal on line 36 indicates that said predetermined relationship does not exist.

The enable/inhibit gate 18 is coupled to the data processor 12 for either enabling or inhibiting the data processor from processing the key data bits 17 retrieved by the data processor 12 from the first section 14 of the memory 10 in accordance with whether or not the authentication unit 16' indicates that the bits stored in the first section 14 of the memory 10 have the predetermined relationship to the bits stored in the second section 15 of the memory 10. When the comparator 32 indicates that the count provided on line 34 by the counter 30 equals the number of bits stored in the first section 14 of the memory 10 so that the authentication unit 16' indicates by a ZERO signal on line 36 that the key data bits stored in the first section 14 of the memory 10 have the predetermined relationship to the check data bits stored in the second section 15 of the memory 10, the gate 18 enables the cryptographic processor 12 to process the key data bits 17 retrieved by the data processor 12 from the first section 14 of the memory 10. When the comparator 32 indicates that the count provided on line 34 by the counter 30 does not equal the number of bits stored in the first section 14 of the memory 10 so that the authentication unit 16 indicates by a ONE signal on line 36 that the key data bits stored in the first section 14 of the memory 10 do not have the predetermined relationship to the check data bits stored in the second section 15 of the memory 10, the gate 18 inhibits the cryptographic processor 12 from processing the key data bits 17 retrieved by the data processor 12 from the first section 14 of the memory 10.

Figure 3:
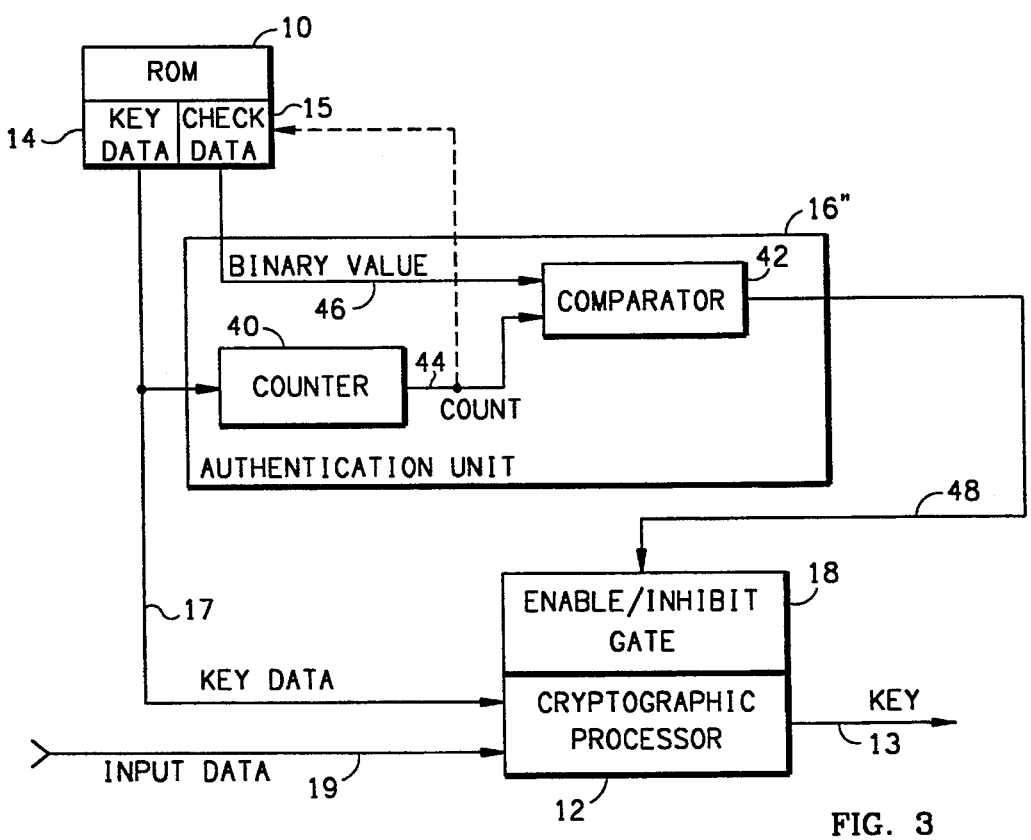
FIG. 3 is a block diagram of another alternative preferred embodiment of a data processing system according to the present invention

Referring to FIG. 3, still another preferred embodiment of a data processing system according to the present invention includes a memory 10, a data processor 12, an authentication unit 16" and an enable/inhibit gate 18. In this embodiment, the memory 10, the data processor 12 and the enable/inhibit gate 18 are the same as in the preferred embodiment described above with reference to FIG. 1, and the predetermined relationship between the key data bits stored in the first section 14 and the check data bits stored in the second section 15 is that the binary value of the bits stored in the second section 15 of the memory 10 is equal to the number of either one type or the other type of the bits stored in the first section 14 of the memory 10.

Since storage of one type of the bits is irreversible, although a pirate can alter the logic state of one type of bit in one section 14/15 of the memory 10, he cannot alter the the logic state of the other type of bit in the other 15/14 of the memory 10 so as make the binary value of the the check data bits in the second section 15 equal to the number of either one type or the other type of the bits stored in the first section 14 of the memory 10.

The authentication unit 16" is coupled to the memory 10 for processing the key data bits stored in the first section 14 of the memory 10 with check data bits stored in the second section 15 of the memory 10 to provide an indication as to whether or not the key data bits have the predetermined relationship to the check data bits. The authentication unit 16" includes a counter 40 and a comparator 42.

The counter 40 is coupled to the memory 10 for counting the total number of either one type or the other type of bits stored in the first section 14 of the memory 10 and for providing said count on line 44 to the comparator 42.

The comparator 42 is coupled to the counter 40 and the memory 10 and compares the count of the counter 40 provided on line 44 with the binary value 46 of the check data bits stored in the second section 15 of the memory 10 to provide an indication as to whether or not said count equals said stored binary value. When the count of the counter 40 provided on line 44 equals said stored binary value, the comparator 42 provides a ZERO signal on line 48 to indicate such equality. When the count of the counter 40 provided on line 44 does not equal said stored binary value, the comparator 42 provides a ONE signal on line 48 to indicate such non-equality.

The counter 40 also is coupled to the memory 10 for storing the count on line 44 in the second section 15 of the memory 10 as the stored binary value (as indicated by dashed line 50) when the key data bits are initially stored in the first section 14 of the memory 10. After the count on line 44 has been stored in the second section 15 of the memory 10 at the time of the initial storage of the key data bits in the first section 14 of the memory 10, further storage of such count in the second section 15 of the memory 10 is inhibited. Such inhibition can be accomplished by blowing a fuse (not shown) in the connection between the counter 40 and the second section 15 of the memory 10.

When the counter 40 counts the type of bit of which storage is irreversible, the comparator provides a ONE signal on line 48 whenever the count on line 44 exceeds the stored binary value 46. When the counter 40 counts the type of bit of which storage is reversible, the comparator provides a ONE signal on line 48 whenever the count on line 44 is less than the stored binary value 46. Since the predetermined relationship of the binary value 46 of the bits stored in the second section 15 of the memory 10 being equal to the number of either one type or the other type of the bits stored in the first section 14 of the memory 10 cannot exist if either the number of the type of irreversible bits in the first section 14 of the memory exceeds the stored binary value or the number of the type of reversible bits in the first section 14 of the memory is less than the stored binary value, the provision by the comparator 42 of a ONE signal on line 48 indicates that said predetermined relationship does not exist.

The enable/inhibit gate 18 is coupled to the data processor 12 for either enabling or inhibiting the data processor from processing the key data bits 17 retrieved by the data processor 12 from the first section 14 of the memory 10 in accordance with whether or not the authentication unit 16" indicates that the bits stored in the first section 14 of the memory 10 have the predetermined relationship to the bits stored in the second section 15 of the memory 10. When the comparator 42 indicates that the count provided on line 44 by the counter 30 equals the binary value 46 stored in the second section 15 of the memory 10 so that the authentication unit 16" indicates by a ZERO signal on line 48 that the key data bits stored in the first section 14 of the memory 10 have the predetermined relationship to the check data bits stored in the second section 14 of the memory 10, the gate 18 enables the cryptographic processor 12 to process the key data bits 17 retrieved by the data processor 12 from the first section 14 of the memory 10. When the comparator 32 indicates that the count provided on line 44 by the counter 30 does not equal the binary value 46 stored in the second section 15 of the memory 10 so that the authentication unit 16 indicates by a ONE signal on line 36 that the key data bits stored in the first section 14 of the memory 10 do not have the predetermined relationship to the check data bits stored in the second section 14 of the memory 10, the gate 18 inhibits the cryptographic processor 12 from processing the key data bits 17 retrieved by the data processor 12 from the first section 14 of the memory 10.

In alternative versions of the above-described preferred embodiments, other types of data processors that process essential data retrieved from a memory may be substituted for the cryptographic processor 12, and such essential data is stored in the first section 14 of the memory 10.

We claim:

1. A data processing system in which processing of retrieved altered data is inhibited, comprising a memory for storing a plurality of data bits and in which the storage of one type of said bits is irreversible;

a data processor coupled to the memory for retrieving said bits from a first section of the memory and for processing the retrieved bits with other data bits;

authentication means coupled to the memory for processing the bits stored in the first section of the memory with bits stored in a second section of the memory to provide an indication as to whether or not the bits stored in the first section of the memory have a predetermined relationship to the bits stored in the second section of the memory; and a gate coupled to the data processor and to the authentication processing means for inhibiting the data processor from processing the data bits retrieved from the first section of the memory unless the authentication means indicate that the bits stored in the first section of the memory have said predetermined relationship to the bits stored in the second section of the memory.

2. A system according to claim 1, wherein the data processor is a cryptographic processor that generates a cryptographic key in response to the data bits retrieved from the first section of the memory.

3. A system according to claim 1, wherein said predetermined relationship is that the bits stored in the first section of the memory are the binary complement of the bits stored in the second section of the memory.

4. A system according to claim 3, wherein the processing means comprise a logic array coupled to the memory for separately comparing each of the bits stored in the first section of the memory with the bits stored in respectively corresponding bit positions of the second section of the memory and for indicating whether any of said compared pairs of bits are the same; and wherein the gate is coupled to the data processor and the logic array for inhibiting the data processor from processing the data bits retrieved from the first section of the memory when the logic array indicates that any of said compared pairs of bits are the same.

5. A system according to claim 4, wherein the data processor is a cryptographic processor that generates a cryptographic key in response to the data bits retrieved from the first section of the memory.

6. A system according to claim 3, wherein the authentication means comprises a counter coupled to the memory for counting the total number of either one type or the other type of the bits stored in both the first section and the second section of the memory; and means coupled to the counter for comparing said count to the number of bits stored in the first section of the memory to provide an indication as to whether or not said count equals the number of bits stored in the first section of the memory; and wherein the gate is coupled to the data processor and the comparing means for inhibiting the data processor from processing the data bits retrieved from the first section of the memory when the comparing means indicate that said count does not equal the number of bits stored in the first section of the memory.

7. A system according to claim 6, wherein the data processor is a cryptographic processor that generates a cryptographic key in response to the data bits retrieved from the first section of the memory.

8. A system according to claim 1, wherein said predetermined relationship is that the binary value of the bits stored in the second section of the memory is equal to the number of either one type or the other type of the bits stored in the first section of the memory.

9. A system according to claim 8, wherein the processing means comprise a counter coupled to the memory for counting either the number of one type or the number of the other type of said bits stored in the first section of the memory; and means coupled to the counter and the memory for comparing said count with a value stored in a second section of the memory to provide an indication as to whether or not said count equals said stored value; and wherein the gate is coupled to the data processor and the comparing means for inhibiting the data processor from processing the data bits retrieved from the first section of the memory when the comparing means indicate that said count does not equal said stored value.

10. A system according to claim 9, wherein the counter is coupled to the memory for storing said count in the second section of the memory as said stored value when data bits are initially stored in the first section of the memory.

11. A system according to claim 9, wherein the data processor is a cryptographic processor that generates a cryptographic key in response to the data bits retrieved from the first section of the memory.

* * * * *